United States Patent [19]

Sakai et al.

[11] Patent Number: 4,663,105
[45] Date of Patent: May 5, 1987

[54] METHOD OF PRODUCING SILICON CARBIDE BASE SINTERED MATERIAL CONTAINING BORON AS SINTERING ASSISTANT

[75] Inventors: Mikio Sakai, Yokosuka; Masaru Naka, Maizuru, both of Japan

[73] Assignee: Nissan Motor Co., Ltd., Yokohama, Japan

[21] Appl. No.: 819,673

[22] Filed: Jan. 17, 1986

[30] Foreign Application Priority Data

Jan. 23, 1985 [JP] Japan .................................. 60-9180

[51] Int. Cl.⁴ .............................................. F27B 9/04
[52] U.S. Cl. ..................................... 264/66; 264/125; 264/126; 501/88; 423/345
[58] Field of Search ......................... 264/66, 125, 126; 501/88; 423/345

[56] References Cited

U.S. PATENT DOCUMENTS

| | | | |
|---|---|---|---|
| 3,487,045 | 12/1969 | Shepard et al. | 260/50 |
| 4,108,929 | 8/1978 | Prochazka et al. | 501/90 |
| 4,124,667 | 11/1978 | Coppola et al. | 501/90 |
| 4,224,073 | 9/1980 | Sasaki et al. | 501/88 |
| 4,502,983 | 3/1985 | Omori et al. | 501/88 |
| 4,569,921 | 2/1986 | Omori et al. | 501/88 |

FOREIGN PATENT DOCUMENTS

| | | |
|---|---|---|
| 0110053 | 6/1984 | European Pat. Off. . |
| 3500962 | 7/1985 | Fed. Rep. of Germany . |
| 50-78609 | 6/1975 | Japan . |
| 2011879 | 7/1979 | United Kingdom . |
| 2137214 | 10/1984 | United Kingdom . |

OTHER PUBLICATIONS

"Chemical Abstracts", vol. 97, 1982, p. 310.

Primary Examiner—Stephen J. Lechert, Jr.
Attorney, Agent, or Firm—Schwartz, Jeffery, Schwaab, Mack, Blumenthal & Evans

[57] ABSTRACT

In producing a SiC base sintered material containing a small amount of B as a sintering assistant, a boron-containing organic compound obtained by reaction between a boron compound and an uncross-linked phenolic resin, either a resol or a novolac, is used instead of using an elemental boron powder. The starting boron compound is, e.g., $H_3BO_3$, $BCl_3$ or $(C_2H_5)_2BOH$. A mixture comprising 100 parts by weight of SiC powder and 2–10 parts by weight of the boron-containing organic compound is compacted or molded into a desired shape, and the shaped material is heated in a nonoxidizing atmosphere first at a relatively low temperature to accomplish thermal decomposition of the boron-containing compound and then at a sufficiently high temperature such as 1800°–2200° C. to accomplish sintering of SiC. By this method agglomeration of boron in the sintered material is prevented, so that sound sintering is achieved in every region of the shaped material. Accordingly the products of this method are high in reliability as to mechanical strength.

11 Claims, 3 Drawing Figures

10μm

10μm 4,663,105

METHOD OF PRODUCING SILICON CARBIDE BASE SINTERED MATERIAL CONTAINING BORON AS SINTERING ASSISTANT

BACKGROUND OF THE INVENTION

This invention relates to a method of producing a silicon carbide base sintered material containing boron as a sintering assistant.

Silicon carbide base ceramics are excellent in many aspects of physical and chemical properties including mechanical strength, heat resistance and corrosion resistance and accordingly can be used as the material of various structural elements.

In producing a silicon carbide base ceramic material of a desired shape by a sintering process, it is known to use boron as a sintering assistant. According to Japanese patent application primary publication No. 50-78609 (1975), for example, a silicon carbide base sintered material is produced by the steps of first mixing a powder of silicon carbide with a powder of boron and a phenolic resin and dispersing the powder mixture in an organic solvent by, e.g., ball milling to thereby obtain a uniformly mixed slurry in which the phenolic resin is dissolved, then removing the solvent from the slurry by a suitable drying method such as spray drying to obtain a powdery or granular mixture of the firstly named ingredients, forming that mixture into a desired shape by a suitable technique such as press compacting or injection molding, heating the shaped material in a nonoxidizing atmosphere until carbonization of the phenolic resin and finally raising the heating temperature up to 1800°–2200° C. to thereby accomplish sintering of silicon carbide in the presence of boron.

However, the products of such a sintering process often suffer from locally unsound sintering and, in extreme cases, there are voids as large as tens of microns in the sintered material. When the sintered material is under some load of stress it is likely that fracture of the sintered material starts at any one of such unsoundly sintered regions. From a practical point of view, this offers a serious problem as to reliability of the sintered material.

We have recognized that a main cause of such unsound sintering is the existence of agglomerates of boron in the green compacts or moldings, and we have confirmed that it is practically impossible to completely disintegrate and disperse some agglomerates existing in the initially added boron powder even by continuing ball-milling of the wet raw material for several days.

SUMMARY OF THE INVENTION

It is an object of the present invention to provide an improved method of producing a silicon carbide base sintered material, which method too utilizes boron as a sintering assistant but does not suffer from unsound sintering or defects attributed to agglomeration of boron in the sintered material, to thereby greatly enhance reliability of the sintered material as the material of structural parts or elements.

According to the invention, a silicon carbide base sintered material is produced by a method comprising the steps of preparing a mixture comprising 100 parts by weight of a silicon carbide powder and 2–10 parts by weight of a boron-containing organic compound which is obtained by reaction between a boron compound and an uncross-linked phenolic resin, forming the mixture into a desirably shaped body, heating the shaped body in a nonoxidizing atmosphere so as to accomplish thermal decomposition of the boron-containing organic compound in the shaped body, and further heating the shaped body in a nonoxidizing atmosphere so as to accomplish sintering of silicon carbide in said shaped body.

The primary feature of the method according to the invention is to use an organic compound of a specific category, viz. a sort of phenolic compound, which contains boron in its chemical structure in contrast to the use of boron in elemental powder form in the prior art. By first uniformly mixing a silicon carbide powder with such a boron-containing organic compound and, if desired, optional auxiliary material(s) such as a lubricating agent and subsequently thermally decomposing and preferably carbonizing the organic components just before sintering of the green composition, it has become possible to prevent existence of agglomerates of boron in the green composition subjected to sintering and to realize truly uniform dispersion of boron in the silicon carbide particles. Therefore, the sintered products of this method are free of defects attributed to agglomeration of boron and possess high reliability as ceramic materials for structural purposes.

It is also an advantage of our method that the material cost in producing the sintered material is greatly reduced since a boron compound which can be obtained at a relatively low cost is used instead of a boron powder which is a very expensive material.

DESCRIPTION OF THE PREFERRED EMBODIMENTS

Figure 1:
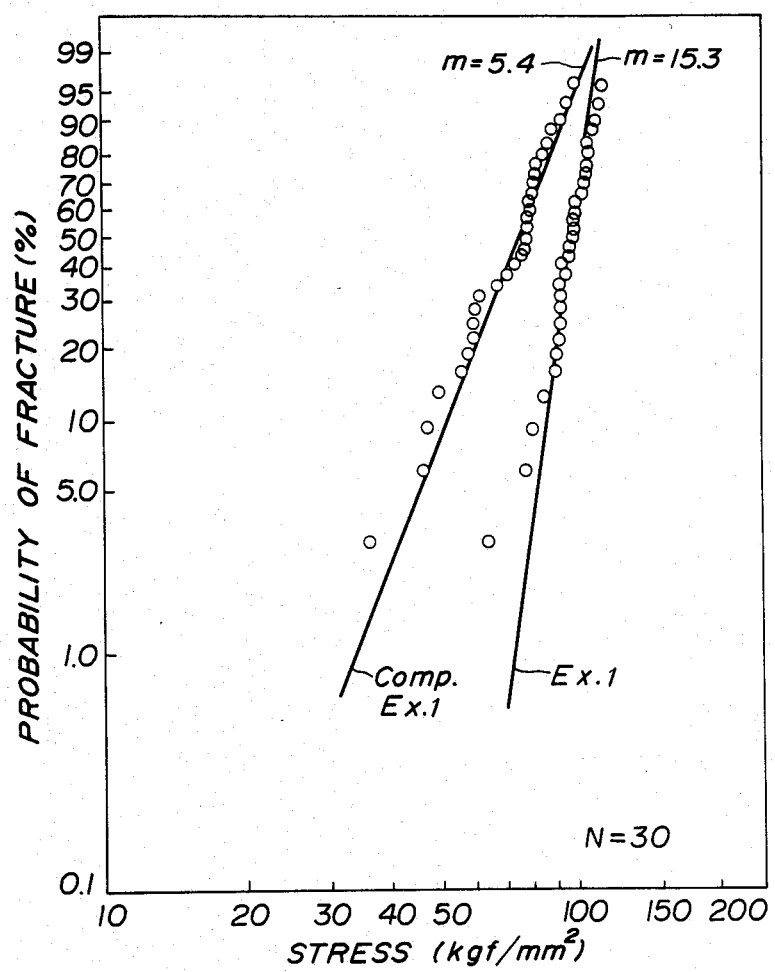
FIG. 1 is a Weibull statistical chart showing the results of a flexural strength test on sintered samples produced in an example of the invention and a comparative example.

In the present invention the phenolic resin to be reacted with a boron compound may be either a resol or a novolac. The boron compound to be reacted with the phenolic resin is preferably selected from boric acid $H_3BO_3$, boron halides including fluoride, bromide, chloride and iodide, a complex of boron trifluoride with methyl alcohol $BF_3 \cdot 2CH_3OH$ and boronic acids such as diethyl boronic acid $(C_2H_5)_2BOH$ and divinyl boronic acid $(CH_2=CH)_2BOH$.

To 100 parts by weight of a SiC powder, 2 to 10 parts by weight of a boron-containing organic compound obtained by reaction between either a resol or a novolac and a selected boron compound is added. If the amount of the boron-containing organic compound is less than 2 parts by weight the sintered material will become insufficient in mechanical strength due to a shortage of the sintering assistant. In such a case the amount of boron will be less than 0.1 wt % of SiC and/or the amount of free carbon will be less than 0.4 wt % of SiC. The mechanical strength of the sintered material becomes lower also when more than 10 parts by weight of the boron-containing organic compound is added due to the presence of an excess of the sintering assistant. In such a case boron will amount to more than 2 wt % of SiC and/or free carbon will amount to more than 1.5 wt % of SiC.

Mixing of a SiC powder and the boron-containing organic compound may be performed in the presence of an organic liquid medium by, e.g., ball milling. After thorough mixing, the mixture is completely dried so as to obtain a powder or fine grains when it is intended to form the mixture into a desired shape by a press compacting method. When the mixture is to be shaped by a plastics shaping method such as extrusion or injection molding it is preferable to perform the mixing with addition of an organic binder suitable for the selected shaping method. For example, the organic binder may be polyethylene, wax and/or ethylene vinyl acetate copolymer. In such a case thorough mixing is accomplished by kneading under adequate heating.

The first-stage heating of the green compacts or moldings is carried out in a nonoxidizing atmosphere at a temperature sufficient for thermal decomposition of the boron-containing organic compound. It is preferable to accomplish carbonization of the organic components of the decomposed compound at this stage. Usually a heating temperature of about 600°–1000° C. suffices for accomplishing such objects. After that the compacts or moldings are sintered by further heating in a nonoxidizing atmosphere at a suitable temperature, which is preferably in the range from about 1800° C. to about 2200° C. In both the first-stage heating and the final heating for sintering, the nonoxidizing atmosphere may be either a vacuum or an unreactive gas atmosphere such as a nitrogen gas atmosphere.

The invention will further be illustrated by the following nonlimitative examples.

EXAMPLE 1

A solution of 5 g of a resol in 50 ml of ethanol and another solution prepared by dissolving 1.5 g of boric acid in 30 ml of ethanol preheated to 70° C. were mixed together, and the resultant reaction liquid was kept heated at 80° C. for 3 hr with continuous stirring. Most of ethanol evaporated during this operation, and the reaction liquid turned into a viscous slurry-like mixture of ethanol and a boron-containing modified phenolic compound. By analysis the chemical structure of this boron-containing compound was found to be as represented by the following formula.

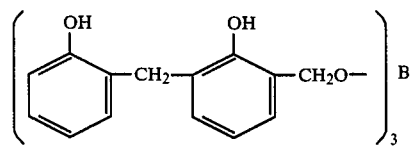

At the end of the analysis process, the entire quantity of the boron-containing compound, viz. an ester of boric acid, obtained from the above described reactants was carbonized by heating it under vacuum ($10^{-1}$ to $10^{-2}$ mmHg) up to 900° C. at a constant temperature rise rate of 100° C./hr. The solid residue was subjected to quantitative analysis by a plasma emission spectral analysis method to find the existence of 1.35 g of C and 0.18 g of B.

The entire amount of the boron-containing phenolic compound formed by the reaction between 5 g of the resol and 1.5 g of boric acid was dissolved in 250 ml of 1,4-dioxane, and 93.5 g of a commercial SiC powder was added to the solution. The resultant mixture was subjected to ball milling for 50 hr to obtain a uniformly mixed slurry. The slurry was sprayed into liquid nitrogen from nozzles having a diameter of 1 mm to thereby produce freeze-dried grains about 1 mm in diameter. The freeze-dried grains were completely dried in a vacuum vessel in which the degree of vacuum was 2 mmHg or higher and the temperature was normal.

The completely dried grains of the SiC-containing mixture was compacted in a metal mold first by applying a pressure of 100 kgf/cm² and then increasing the compacting pressure to 2000 kgf/cm² by using a hydrostatic cold press machine. The green compact prepared in this manner had the shape of an elongate plate 6 mm wide, 50 mm long and 4.5 mm thick.

The green compact was heated under vacuum ($10^{-1}$ to $10^{-2}$ mmHg) up to 900° C. at a constant temperature rise rate of 100° C./hr to thereby accomplish thermal decomposition and carbonization of the boron-containing compound included in the raw mixture. After that the compact was sintered by heating at 2050° C. under vacuum of $10^{-3}$ to $10^{-4}$ mmHg for 30 min. The apparent density of the sintered body was 3.11 g/cm³, which was 97.2% of the theoretical density.

Thirty (30) samples of the same plate-shaped sintered bodies were produced by the same process, and a transverse test was made at room temperature on test pieces cut out of the respective samples. Every test piece was 4 mm wide, 40 mm long and 3 mm thick, and the span was 30 mm. As the result, the flexural strength was 97.8 kgf/mm² on the average and the Weibull coefficient (m) was 15.3. After the transverse test, every test piece was subjected to analysis of the starting point of fracture to obtain the result shown in Table 1.

COMPARATIVE EXAMPLE 1

A mixture of 94.8 g of the SiC powder used in Example 1, 5 g of the resol used in Example 1, 0.2 g of an amorphous boron powder and 200 ml of 1,4-dioxane was ball-milled for 50 hr to obtain a uniformly mixed slurry. This slurry was freeze-dried and the obtained grains were further dried under vacuum in the same manner as in Example 1. The dried grains were compacted and sintered under the same conditions as in Example 1. In this case the apparent density of the sintered body was 3.08 g/cm³, which was 96.3% of the theoretical density.

On similarly produced 30 samples the transverse test was made in the same manner as in Example 1. In this case the flexural strength was 75.6 kgf/mm² on the average, and the Weibull coefficient was 5.4. The result of the analysis of the starting point of fracture in every test piece was as shown in Table 1.

TABLE 1

| Defective Factor | Itemization of 30 Test Pieces | |
|---|---|---|
| to Fracture | Example 1 | Comparative Example 1 |
| agglomeration of boron | 0 | 12 |
| agglomeration of carbon | 7 | 10 |
| surface defect | 15 | 6 |
| uncertain | 8 | 2 |

As can be seen in Table 1, in the case of Comparative Example 1 wherein boron and resol were independently added to the silicon carbide powder, the sintered products possessed considerable defects attributed to agglomeration of boron.

FIG. 1 is a Weibull statistical chart prepared from the results of the transversal test on the sintered samples of Example 1 and Comparative Example 1. This chart clearly indicates that silicon carbide base sintered bodies obtained by the present invention are remarkably lower in the probability of fracture than analogous sintered bodies produced by using boron in elemental form.

Figure 2:
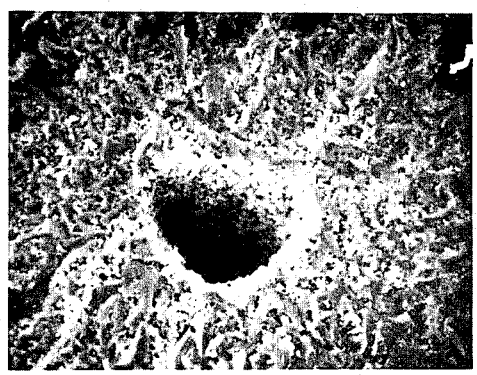
FIG. 2 is a SEM micrograph (600×) showing the starting point of fracture in a sintered sample produced and tested in a comparative example.
Figure 3:
FIG. 3 is a micrograph (600×) showing the result of planar analysis of boron in the sample shown in FIG. 26 by XMA.

The SEM micrograph (600×) of FIG. 2 shows the particulate structure at the starting point of fracture in an example of the 30 test pieces tested in Comparative Example 1, and the micrograph (600×) of FIG. 3 shows the result of planar analysis of boron in the same region of the same test piece by XMA. As represented by FIG. 2, in the samples sintered in Comparative Example 1 using a boron powder it was often that a relatively large void existed at the starting point of fracture. As can be seen in FIG. 3, the cause of such a void was agglomeration of boron. In contrast, in the samples sintered and tested in Example 1 no void was recognized at the starting point of fracture in any sample, and agglomeration of boron could not be detected by planar analysis with XMA.

EXAMPLE 2

A solution was prepared by dissolving 1 ml of boron trichloride in 50 ml of acetone kept cooled at 0° C., and another solution by dissolving 5 g of the resol in 50 ml of acetone at room temperature. These two solutions were mixed together and continuously stirred for 4 hr at room temperature to thereby evaporate most of acetone. After that the mixed solution was left standing at room temperature for 1 day to thereby obtain a viscous slurry-like liquid containing a boron-containing modified resol.

The viscous liquid was dissolved in 250 ml of 1,4-dioxane followed by the addition of 94.2 g of SiC powder, and the resultant mixture was subjected to ball milling for 50 hr to thereby obtain a uniformly mixed slurry. After that the graining, compacting and sintering process of Example 1 was performed in the same manner.

In this case the apparent density of the sintered body was 3.07 g/cm$^3$, which was 95.9% of the theoretical density. As the result of the aforementioned transverse test the flexural strength was 81.7 kgf/mm$^2$ on the average, and the Weibull coefficient was 13.4.

For the sake of analysis the boron-containing modified resol prepared in this example was carbonized by the same heating method as in Example 1. Quantitative analysis of the solid residue revealed the existence of 1.29 g of C and 0.10 g of B.

EXAMPLE 3

A solution prepared by dissolving 2.5 ml of boron tribromide in 50 ml of acetone at room temperature and another solution prepared by dissolving 5 g of the resol in 50 ml of acetone at room temperature were mixed together. The resultant reaction liquid was kept heated at 70° C. for 6 hr with continuous stirring and thereafter was left standing at room temperature for 1 day. As the result most of acetone evaporated to leave a viscous slurry-like liquid containing a boron-containing modified resol.

The viscous liquid was dissolved in 250 ml of 1,4-dioxane followed by the addition of 92.5 g of SiC powder, and the resultant mixture was ball-milled for 50 hr to thereby obtain a uniformly mixed slurry. After that the graining, compacting and sintering process of Example 1 was performed in the same manner.

In this case the apparent density of the sintered body was 3.01 g/cm$^3$, which was 94.1% of the theoretical density. The flexural strength of the sintered products (30 samples) was 73.1 kgf/mm$^2$ on the average, and the Weibull coefficient was 16.1.

After carbonizing the boron-containing modified resol prepared in this example by the same heating method as in Example 1, quantitative analysis of the solid residue revealed the existence of 1.34 g of C and 0.11 g of B.

EXAMPLE 4

A solution of 7.5 g of a novolac in 50 ml of ethanol and another solution prepared by dissolving 1 g of boric acid in 30 ml of ethanol preheated to 70° C. were mixed together. The resultant reaction liquid was kept heated at 70° C. for 6 hr with continuous stirring and thereafter was left standing at room temperature for 1 day. As the result most of ethanol evaporated to leave a viscous slurry-like liquid containing a boron-containing phenolic compound.

The viscous liquid was dissolved in 250 ml of 1,4-dioxane followed by the addition of 91.5 g of SiC powder, and the resultant mixture was ball-milled for 50 hr to thereby obtain a uniformly mixed slurry. After that the graining, compacting and sintering process of Example 1 was performed in the same manner.

In this case the apparent density of the sintered body was 2.95 g/cm$^3$, which was 92.2% of the theoretical density. The flexural strength of the sintered products (30 samples) was 68.7 kgf/mm$^2$ on the average, and the Weibull coefficient was 15.0.

After carbonizing the boron-containing phenolic compound prepared in this example by the same heating method as in Example 1, quantitative analysis of the solid residue revealed the existence of 1.8 g of C and 0.15 g of B.

EXAMPLE 5

A solution of 5 g of the resol in 50 ml of ethanol and another solution of 3 ml of $BF_3.2CH_3OH$ in 50 ml of ethanol were mixed together at room temperature. The resultant reaction liquid was kept heated at 80° C. for 5 hr with continuous stirring and thereafter was left standing at room temperature for 1 day. As the result most of ehtanol evaporated to leave a viscous slurry-like liquid containing a boron-containing phenolic compound.

The viscous liquid was dissolved in 250 ml of 1,4-dioxane followed by the addition of 92 g of SiC powder. After that the ball-milling, graining, compacting and sintering process of Example 1 was performed in the same manner.

In this case the apparent density of the sintered body was 2.97 g/cm$^3$, which was 92.8% of the theoretical density. The flexural strength of the sintered products (30 samples) was 70.8 kgf/mm$^2$ on the average, and the Weibull coefficient was 12.4.

After carbonizing the boron-containing phenolic compound prepared in this example, by the same heating method as in Example 1, quantitative analysis of the solid residue revealed the existence of 1.27 g of C and 0.10 g of B.

EXAMPLE 6

A solution of 5 g of the resol in 50 ml of ethanol and another solution of 2.5 ml of $(C_2H_5)_2BOH$ in 50 ml of ethanol were mixed together at room temperature. The resultant reaction liquid was kept heated at 80° C. for 6 hr with continuous stirring and thereafter was left standing at room temperature for 1 day. As the result most of ethanol evaporated to leave a viscous slurry-like liquid containing a boron-containing modified resol.

The viscous liquid was dissolved in 250 ml of 1,4-dioxane followed by the addition of 92.5 g of SiC powder. After that the ball-milling, graining, compacting and sintering process of Example 1 was performed in the same manner.

In this case the apparent density of the sintered body was 3.05 g/cm$^3$, which was 95.3% of the theoretical density. The flexural strength of the sintered products (30 samples) was 84.0 kgf/mm$^2$ on the average, and the Weibull coefficient was 17.5.

After carbonizing the boron-containing phenolic compound prepared in this example by the same heating method as in Example 1, quantitative analysis of the solid residue revealed the existence of 1.33 g of C and 0.17 g of B.

EXAMPLE 7

A solution of 5 g of the resol in 50 ml of ethanol and another solution of 2.5 ml of $(CH_2=CH)_2BOH$ in 50 ml of ethanol were mixed together at room temperature. The resultant reaction liquid was kept heated at 80° C. for 6 hr with continuous stirring and thereafter was left standing at room temperature for 1 day. As the result most of ethanol evaporated to leave a viscous slurry-like liquid containing a boron-containing modified resol.

The viscous liquid was dissolved in 250 ml of 1,4-dioxane followed by the addition of 92.5 g of SiC powder. After that the ball-milling, graining, compacting and sintering process of Example 1 was performed in the same manner.

In this case the apparent density of the sintered body was 3.06 g/cm$^3$, which was 95.6% of the theoretical density. The flexural strength of the sintered products (30 samples) was 82.1 kgf/mm$^2$ on the average, and the Weibull coefficient was 16.9.

After carbonizing the boron-containing phenolic compound prepared in this example by the same heating method as in Example 1, quantitative analysis of the solid residue revealed the existence of 1.37 g of C and 0.14 g of B.

EXAMPLE 8

In this example and also in the subsequent examples, organic binders were additionally used in mixing SiC powder with a boron-containing organic compound.

First, a solution of 55 g of the resol used in Example 1 in 500 ml of ethanol and another solution prepared by dissolving 17 g of boric acid in 300 ml of ethanol preheated to 70° C. were mixed together. The resultant reaction liquid was kept heated at 80° C. for 6 hr with continuous stirring. As the result most of ethanol evaporated, and the reaction liquid turned into a viscous slurry-like mixture of ethanol and a boron-containing modified phenolic compound. By analysis the chemical structure of this boron-containing compound was found to be the borid acid ester represented by the formula given in Example 1.

A mixture of 1000 g of a very fine powder of SiC, 30 g of an ethylene-vinyl acetate copolymer (EVA), 30 g of low-density polyethylene, 70 g of polyethylene wax, 35 g of a montanic acid ester wax, 10 g of an alkylolamide base surface-active agent, 10 g of a modified ester base lubricating agent and 5 g of dibutyl phthalate was kneaded under pressure at 160° C. for 10 min. Then the entire amount of the firstly prepared viscous slurry-like mixture was added to the mixture in the kneader, and kneading was continued for additional 20 min. The kneaded mixture was pelletized and then fed to a horizontal type extruder provided with a degassing means. In the extruder the heating cylinder temperature was set at 160° C. and the die temperature was 25° C. The raw composition was extruded into the form of a continuous rod having a rectangular cross-section 5 mm × 10 mm in widths, and it was severed into 50 mm long rods.

In a nitrogen gas stream the 50 ml long rods in green state were heated up to 600° C. at a temperature rise rate of 10° C./hr and kept at that temperature for 2 hr to thereby dissipate the low boiling point components. After that the temperature was raised up to 900° C. at a rate of 100° C./hr, and heating at that temperature was continued for 1 hr to accomplish carbonization of the boron-containing compound included in the raw composition. After furnace cooling the heat-treated rods were observed to be defectless.

The thus treated rods were sintered at 2050° C. for 30 min under vacuum of $10^{-3}$–$10^{-4}$ mmHg. At the start the temperature was raised up to 2050° C. at a rate of 500° C./hr. The sintered rods had an apparent density of 3.08 g/cm$^3$, which was 96.3% of the theoretical density.

At room temperature the bending test was made on test pieces cut out of 30 samples of the sintered rods. Every test piece was 4 mm wide, 36 mm long and 3 mm thick, and the span was 30 mm. As the result, the flexural strength was 86.4 kgf/mm$^2$ on the average and the Weibull coefficient was 13.7.

COMPARATIVE EXAMPLE 2

In place of the boric acid ester prepared and used in Example 8, a mixture of 50 g of the resol and 20 g of a powder (−325 mesh) of amorphous boron was used. Otherwise, the entire process of Example 8 was repeated.

In this case the apparent density of the sintered products in rod shape was 2.82 g/cm$^3$, which was 88.1% of the theoretical density. In this case the flexural strength of the sintered products (30 samples) was 20.7 kgf/mm$^2$ on the average, and the Weibull coefficient was 17.6.

COMPARATIVE EXAMPLE 3

A mixture of 1896 g of a fine powder of SiC, 100 g of the resol, 4 g of the aforementioned amorphous boron powder and 400 ml of acetone was ball-milled for 48 hr. The pot of the ball mill was made of nylon, and the ball material was a sintered hard alloy. The resultant slurry-like mixture was dried by spray drying to obtain dry grains. At the spray drying operation ultrasonic vibrations were continuously applied to the slurry-like mixture to prevent segregation and coagulation of each ingredient.

Next, 1050 g of the dry grains prepared by the above process was mixed with the binder material described in Example 8. The quantities of the binder materials were the same as in Example 8. The mixture was kneaded under pressure at 160° C. for 30 min. After that the extruding, preheating and sintering process of Example 8 was performed in the same manner.

In this case the apparent density of the sintered products was 3.10 g/cm$^3$, which was 96.9% of the theoretical density. The flexural strength of the sintered products (30 samples) was 54.0 kgf/mm$^2$ on the average, and the Weibull coefficient was 8.1.

EXAMPLE 9

The resol modifying reaction in Example 2 was carried out in the same manner except that the quantities of boron trichloride and the resol were increased to 10 ml and to 50 g, respectively, and the total quantity of acetone to 1000 ml.

The entire process mentioned in Example 9 was repeated except that the boron-containing phenolic compound was changed to the one prepared in Example 10.

The sintered products had an apparent densrty of 3.03 g/cm$^3$, which was 94.7% of the theoretical density. The flexural strength of the sintered products (30 samples) was 73.5 kgf/mm$^2$ on the average, and the Weibull coefficient was 17.8.

EXAMPLE 11

The novolac modifying reaction in Example 4 was carried out in the same manner except that the quantities of the novolac and boric acid were increased to 75 g and to 10 g, respectively, and the total quantity of ethanol to 800 ml.

The entire process mentioned in Example 9 was repeated except that the boron-containing phenolic compound was changed to the one prepared in Example 11.

The sintered products had an apparent density of 2.98 g/cm$^3$, which was 93.1% of the theoretical density. The flexural strength of the sintered products (30 samples) was 69.8 kgf/mm$^2$ on the average, and the Weibull coefficient was 19.1.

EXAMPLE 12

The resol modifying reaction in Example 5 was carried out in the same manner except that the quantities of the resol and BF$_3$. 2CH$_3$OH were increased to 50 g and to 30 ml, respectively, and the total quantity of ethanol to 1000 ml.

The entire process mentioned in Example 9 was repeated except that the boron-containing phenolic compound was changed to the one prepared in Example 12.

The sintered products had an apparent density of 3.01 g/cm$^3$, which was 94.1% of the theoretical density. The flexural strength of the sintered products (30 samples) was 72.6 kgf/mm$^2$ on the average, and the Weibull coefficient was 16.9.

EXAMPLE 13

The resol modifying reaction in Example 6 was carried out in the same manner except that the quantities of the resol and (C$_2$H$^5$)$_2$BOH were increased to 50 g and to 25 ml, respectively, and the total quantity of ethanol to 1000 ml.

The entire process mentioned in Example 9 was repeated except that the boron-containing phenolic comopound was changed to the one prepared in Example 13.

The sintered products had an apparent density of 3.03 g/cm$^3$, which was 94.7% of the theoretical density. The flexural strength of the sintered products (30 samples) was 81.6 kgf/mm$^2$ on the average, and the Weibull coefficient was 18.1.

EXAMPLE 14

The resol modifying reaction in Example 7 was carried out in the same manner except that the quantities of the resol and (CH$_2$=CH)$_2$BOH were increased to 50 g and to 25 ml, respectively, and the total quantity of ethanol to 1000 ml.

The entire process mentioned in Example 9 was repeated except that the boron-containing phenolic compound was changed to the one prepared in Example 14.

The sintered products had an apparent density of 3.02 g/cm$^3$, which was 94.4% of the theoretical density. The flexural strength of the sintered products (30 samples) was 80.4 kgf/mm$^2$ on the average, and the Weibull coefficient was 16.3.

EXAMPLE 15

The resol modifying reaction in Example 18 was repeated.

A mixture of 1000 g of a very fine powder of SiC, 50 g of EVA, 50 g of low-density polyethylene, 40 g of polyethylene wax, 35 g of a montanic acid ester wax, 10 g of an alkylolamide base surface-active agent, 10 g of a modified ester base lubricating agent and 5 g of dibutyl phthalate was kneaded under pressure at 180° C. for 10 min. Then the entire amount of the boron-containing phenolic compound in the form of a viscous slurry obtained by the aforementioned reaction was added to the mixture in the kneader, and kneading was continued for additional 20 min. The kneaded composition was pelletized and then was molded into rods, which were 50 mm long and had a rectangular cross-section 5 mm ×10 mm in widths, by injection molding using a vertical plunger type injection molding machine. The injection molding conditions: heating cylinder temperature was 180° C., die temperature was 35° C., injection pressure was 1000 kgf/cm$^2$, dwelling pressure was 50 kgf/cm$^2$, dwelling time was 30 sec.

In a nitrogen gas stream the injection-molded rods in green state were heated up to 600° C. at a rate of 10° C./hr and kept at that temperature for 2 hr to thereby dissipate the low boiling point components. After that the temperature was raised up to 900° C. at a rate of 1000° C./hr, and heating at that temperature was continued for 1 hr to accomplish carbonization of the boron-containing compound included in the raw composition. After cooling the heat-treated rods were observed to be defectless. The thus treated rods were sintered in a vacuum furnace under the same conditions as in Example 8. The sintered rods had an apparent density of 3.11 g/cm$^3$, which was 97.2% of the theoretical density.

At room temperature a transverse test was made on test pieces cut out of 30 samples of the sintered rods. The dimensions of the test pieces were as described in Example 8. The flexural strength of the samples was 89.7 kgf/mm$^2$ on the average, and the Weibull coefficient was 13.5.

COMPARATIVE EXAMPLE 4

In place of the boron-containing phenolic compound prepared and used in Example 15, a mixture of 50 g of the resol and 20 g of a powder (−325 mesh) of amorphous boron was used. Otherwise, the entire process of Example 15 was repeated.

In this case the sintered rods had an apparent density of 2.83 g/cm$^3$, which was 88.4% of the theoretical density. The flexural strength of the sintered products (30 samples) was 21.6 kgf/mm² on the average, and the Weibull coefficient was 17.8.

COMPARATIVE EXAMPLE 5

A mixture of 1896 g of SiC powder, 100 g of the resol and 4 g of the amorphous boron powder was grained in the same manner as in Comparative Example 3, and 1050 g of the dry grains was mixed with the binder materials used in Example 15. The mixture was kneaded under pressure at 180° C. for 30 min. After that the injection modling, preheating and sintering process of Example 15 was performed in the same manner.

The sintered rods had an apparent density of 3.09 g/cm³, which was 96.6% of the theoretical density. The flexural strength of the sintered products (30 samples) was 53.2 kgf/mm² on the average, and the Weibull coefficient was 8.5.

In the following Examples 16-21, the boron-containing phenolic compoounds obtained in Examples 9-14, respectively, were alternately used to repeat the process of Example 15 except the resolmodifying reaction.

EXAMPLE 16

The boron-containing phenolic compound was the product of the reaction mentioned in Example 9.

The sintered rods had an apparent density of 3.07 g/cm³, which was 95.9% of the theoretical density. The flexural strength of the sintered products (30 samples) was 79.6 kgf/mm² on the average, and the Weibull coefficient was 18.3.

EXAMPLE 17

The boron-containing phenolic compound was the product of the reaction mentioned in Example 10.

The sintered rods had an apparent density of 3.01 g/cm³, which was 94.1% of the theoretical density. The flexural strength of the sintered products (30 samples) was 71.3 kgf/mm² on the average, and the Weibull coefficient was 17.2.

EXAMPLE 18

The boron-containing phenolic compound was the product of the reaction mentioned in Example 11.

The sintered rods had an apparent density of 2.95 g/cm³, which was 92.2% of the theoretical density. The flexural strength of the sintered products (30 samples) was 68.7 kgf/mm² on the average, and the Weibull coefficient was 19.6.

EXAMPLE 19

The boron-containing phenolic compound was the product of the reaction mentioned in Example 12.

The sintered rods had an apparent density of 2.97 g/cm³, which was 92.8% of the theoretical density. The flexural strength of the sintered products (30 samples) was 70.4 kgf/mm² on the average, and the Weibull coefficient was 17.2.

EXAMPLE 20

The boron-containing phenolic compound was the product of the reaction mentioned in Example 13.

The sintered rods had an apparent density of 3.05 g/cm³, which was 92.8% of the theoretical density. The flexural strength of the sintered products (30 samples) was 83.0 kgf/mm² on the average, and the Weibull coefficient was 17.8.

EXAMPLE 21

The boron-containing phenolic compound was the product of the reaction mentioned in Example 14.

The sintered rods had an apparent density of 3.06 g/cm³, which was 95.6% of the theoretical density. The flexural strength of the sintered products (30 samples) was 81.1 kgf/mm² on the average, and the Weibull coefficient was 16.9.

What is claimed is:

1. A method of producing a silicon carbide base sintered material, the method comprising the steps of
    preparing a mixture comprising 100 parts by weight of a silicon carbide powder and 2-10 parts by weight of a boron-containing organic compound which is obtained by reaction between a boron compound and an uncross-linked phenolic resin;
    forming said mixture into a desirably shaped body;
    heating said shaped body in a nonoxidizing atmosphere so as to accomplish thermal decomposition of said boron-containing organic compound in said shaped body; and
    further heating said shaped body in a non-oxidizing atmosphere so as to accomplish sintering of silicon carbide in said shaped body.

2. A method according to claim 1, wherein said boron compound is boric acid.

3. A method according to claim 1, wherein said boron compound is a boron halide.

4. A method according to claim 1, wherein said boron compound is a complex of boron trifluoride with methyl alcohol represented by the formula $BF_3 \cdot 2CH_3OH$.

5. A method according to claim 1, wherein said boron compound is selected from the group consisting of $(C_2H_5)_2BOH$ and $(CH_2=CH)_2BOH$.

6. A method according to claim 1, wherein said uncross-linked phenolic resin is selected from the group consisting of resols and novolacs.

7. A method according to claim 1, wherein said boron-containing organic compound is a boric acid ester having the chemical structure represented by the following formula:

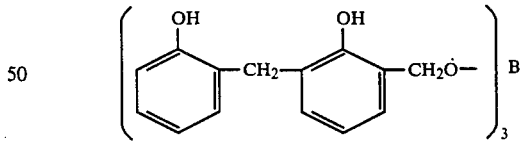

8. A method according to claim 1, wherein the last heating step is accomplished at a temperature in the range from about 1800° C. to about 2200° C.

9. A method according to claim 1, wherein said mixture further comprises an organic binder.

10. A method according to claim 9, wherein said mixture is formed into said shaped body while said mixture is in a plastic state.

11. A method according to claim 1, wherein said mixture is formed into said shaped body by press compacting while said mixture is in a dry and powdery or granular state.

* * * * *